(12) United States Patent
Shimizu et al.

(10) Patent No.: US 7,481,968 B2
(45) Date of Patent: Jan. 27, 2009

(54) METHOD FOR PREPARING A SINTERED POROUS BODY OF METAL OR CERAMIC

(75) Inventors: Toru Shimizu, Tsukuba (JP); Kanichi Hatsukano, Tsukuba (JP); Kotaro Hanada, Tsukuba (JP); Kunio Matsuzaki, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 143 days.

(21) Appl. No.: 11/076,229

(22) Filed: Mar. 10, 2005

(65) Prior Publication Data
US 2005/0207928 A1    Sep. 22, 2005

(30) Foreign Application Priority Data
Mar. 17, 2004    (JP) .............................. 2004-076979

(51) Int. Cl.
*B22F 3/11*    (2006.01)
*B29C 39/02*    (2006.01)

(52) U.S. Cl. ................................ 419/2; 419/36; 264/28; 264/44

(58) Field of Classification Search ...................... 419/2, 419/36; 75/252; 264/28, 44
See application file for complete search history.

(56) References Cited
U.S. PATENT DOCUMENTS

| 3,897,221 | A | * | 7/1975 | Salyer et al. ..................... 419/2 |
| 4,713,277 | A | | 12/1987 | Akiyama et al. |
| 5,151,246 | A | | 9/1992 | Baumeister et al. |
| 5,171,720 | A | * | 12/1992 | Kawakami .................... 501/80 |
| 5,848,351 | A | | 12/1998 | Hoshino et al. |
| 5,972,284 | A | * | 10/1999 | Lindsten et al. ................ 419/2 |
| 6,395,202 | B1 | * | 5/2002 | Nagel et al. .................... 264/28 |
| 6,660,224 | B2 | * | 12/2003 | Lefebvre et al. ............... 419/2 |

FOREIGN PATENT DOCUMENTS

| JP | 9-87704 | 3/1997 |
| JP | 3246190 | 11/2001 |
| JP | 3303181 | 5/2002 |
| JP | 2003-27157 | 1/2003 |

* cited by examiner

*Primary Examiner*—Roy King
*Assistant Examiner*—Ngoclan T Mai
(74) *Attorney, Agent, or Firm*—Wenderooh, Lind & Ponack, L.L.P.

(57) ABSTRACT

A novel method is disclosed for the preparation of a sintered porous body of a metallic or ceramic powder having a closed cell texture and a porosity as high as 95% or higher. The method comprises the steps of: preparing a foamable aqueous slurried composition containing a powder of the metallic or ceramic material, a blowing agent and a binder resin which is a water-soluble polymer capable of becoming gelled; subjecting the slurried composition to gelation of the binder resin; subjecting the gelled mass of the composition to foaming by gas-evolution from the blowing agent; and heating the thus gelled and foamed body of the composition to effect drying and sintering of the particles of the metallic or ceramic powder.

3 Claims, No Drawings

METHOD FOR PREPARING A SINTERED POROUS BODY OF METAL OR CERAMIC

BACKGROUND OF THE INVENTION

The present invention relates to a method for the preparation of a sintered porous body of a metal or ceramic.

Porous bodies of a metal are known in the prior art and can be prepared by several methods including (1) blowing of a gas into a melt of the metal, (2) mixing hollow balloons to a melt and (3) admixing of a melt with a blowing agent such as titanium hydride $TiH_2$ followed by blowing of the agent.

These prior art methods, however, have their respective problems and disadvantages. For example, these methods have a limitation in the selection of the metal which must have a relatively low melting point enabling easy handling of the melt or in the selection of the blowing agent which must have a gas-evolution temperature in good matching with the melting behavior of the melt. The rheological behavior of the metal melt such as viscosity is also an important factor in order to minimize escape of the blowing gas from the body of the melt. Due to these situations, it is the present status of the art that the prior art methods have been applied only to the preparation of porous bodies of aluminum and a few others.

Proposals have been made for an improvement of the prior art methods in which a composition prepared by blending a metal powder and a blowing agent is subjected to molding by powder forging or by extrusion into a shaped body which is subjected to foaming and sintering by heating at a temperature in the vicinity of the gas-release temperature of the blowing agent. This method is also hardly applicable to a variety of metals other than aluminum and the like due to the requirement for matching between the gas-release temperature of the blowing agent and the melting behavior of the metal.

As a further improvement of the prior art methods, proposals are made according to which a compound or a slurry comprising a metal powder and a binder resin is admixed with a burnt-off material which is lost by heating for sintering of the metal powder or the compound or slurry is subjected to direct foaming. These methods are also not free from problems. Namely, the former of these methods has a limitation in the highest porosity of the porous bodies obtained by the method which can hardly exceed 80%.

As a variation of the latter of these methods for direct foaming, by which a porosity of as high as 95% or higher can be accomplished, there is known a method in which a foaming precursor blend is prepared by admixing a metal powder to a foaming premix for the preparation of a polyurethane foam and the precursor blend is subjected to a foaming treatment in the same manner as in the preparation of a foamed polyurethane body. Even though the highest porosity obtained by this method can be so high as mentioned above with sufficiently good fineness of the foam cells, the foamed body has an open cell texture rather than a closed cell texture desirable in most applications in addition to the problem due to the residual silica or phosphorus-containing impurities derived from the foaming conditioner agent in the polyurethane formulation.

As a modification of the prior art methods, a method is proposed in Japanese Patent Kokai No. 9-87704 in which a slurried blend with admixture of a blowing agent is sheeted by means of a doctor blade under heating to effect simultaneous foaming and drying of the sheet into a foamed precursor body having a porosity of 95% or even higher. A problem in this method is a limitation in the maximum thickness of the foamed body, which can hardly exceed 1 cm, because the foaming treatment is effected for a sheet of the slurried blend of which the thickness is under limitations by the weight of the slurried blend per se and the binding performance, e.g., viscosity, of the binder resin rarely enabling to obtain a bulky foamed body which should desirably have a closed cell texture.

As is understood from the above description of the present status of the art, it is eagerly desired to develop an industrial method for the preparation of a sintered porous body of a metal powder in a bulky form having a porosity of 95% or higher with a closed cell texture.

SUMMARY OF THE INVENTION

It is therefore an object of the present invention to provide a novel method for the preparation of a sintered porous body of a metal or a ceramic material free from the above described limitations in the prior art methods. The inventive method is applicable to a wide variety of metals irrespective of the melting point as well as to a variety of ceramic powders poorly workable in the prior art methods.

As a result of their extensive investigations with the above-mentioned object, the inventors have arrived at a discovery that, when the binder resin blended with a metal powder is a water-soluble polymer capable of becoming a gel under certain conditions and an aqueous slurried blend containing the binder resin together with a powder of a metal or ceramic material and a blowing agent is subjected to foaming and sintering not as such but after shaping into a definite form with gelation of the binder resin, the porosity of the porous sintered body, which has a closed cell texture, can be as high as 95% or higher without the limitation on the bulkiness of the body leading to completion of the present invention on the base of this discovery.

Thus, the method of the present invention for the preparation of a sintered porous body of a metal or a ceramic material comprises the steps of:

(a) preparing an aqueous blend containing water, a powder of a metal or a ceramic material, a blowing agent and a binder resin which is a water-soluble polymer capable of being gelled;

(b) effecting gelation of the binder resin in the aqueous blend to form a gelled mass;

(c) effecting foaming of the gelled mass by gas-releasing from the blowing agent to give a foamed body of the gelled mass; and (d) heating the foamed body to effect drying thereof and sintering the powder of the metal or the ceramic material.

As a modification of the above described basic inventive method comprising the steps (a) to (d), referred to as the procedure (1), the inventive method can further comprise the following procedures or features including:

(2) that the aqueous blend prepared in step (a) further contains a surface active agent;

(3) that the water-soluble polymer capable of being gelled is a polyvinyl alcohol;

(4) that the gelled mass obtained in step (b) is shaped into a definite form;

(5) that the powder of a metal is a powder recovered from a grinder sludge; and (6) that the present invention is drawn to a foaming precursor used in the above described procedures (1) to (5).

DETAILED DESCRIPTION OF THE PREFERRED EMBODIMENTS

One of the great advantages obtained by the inventive method is that the metallic material of which the sintered porous body is prepared according to the inventive method is not limited to those having a relatively low melting point enabling easy handling of the melt or good matching is not required between the melt behavior of the metal and the gas-releasing characteristic of the blowing agent so that the inventive method is applicable not only to a wide variety of metallic materials but also to a variety of ceramic materials as a class of hardly workable materials in a relatively simple and convenient procedure. Accordingly, the inventive method is applicable to the manufacture of materials used in a variety of industrial fields including construction materials for aircrafts and spacecrafts, sporting goods and others where the material is required to have a light weight and a high mechanical strength, heat-insulating materials, heat-resistant materials, vibration-absorbing materials, shock-absorbing or damping materials in packaging and the like as well as filtering materials, catalyst carriers in chemical reactions, electrode materials and others where a large surface area of the material is essential. Development is expected of the inventive method to the biological or medical fields where good compatibility is essential between the living body and the material used therein.

In step (a) of the inventive method, a water-base blend or slurry of the metallic or ceramic powder is prepared with admixture of a binder resin, which must be capable of being gelled, and a blowing agent. The slurried composition is then subjected to gelation of the binder resin and shaped or molded into a definite form which is then heated to effect foaming by gas-release from the blowing agent to give a foamed porous body which has a closed cell texture followed by sintering. The closed cell texture here implied is defined to be a structure of a porous body in which substantially all of the cells are surrounded and closed by the cell faces. In contrast, an open cell texture is a structure of a porous body in which closure of the cells with the cell faces is incomplete so that cells have communication with the others with occurrence of cell edges as a major cell-forming element. It should be mentioned, however, that not all of the cells in a closed cell texture are necessarily isolated cells due to break of the foams in the foaming procedure to form intercommunicated cells more or less. In the porous cellular body obtained in the inventive method, it is usual that the cell faces are covered with the particles of the metallic or ceramic powder forming a single or double layer so that the thickness of the cell walls in the inventive method after sintering can be estimated to be about equivalent to the diameter of the particles of the metallic or ceramic powder.

The metallic material for the metal powder in the inventive method is not particularly limitative to particular metals provided that the metal powder is stable or inert to water in the aqueous slurried composition. Accordingly, a great variety of powders of metals can be used in the inventive method including powders of noble metals such as gold, platinum, palladium, silver and the like as well as alloys thereof, nickel and nickel-based alloys, steels such as general-purpose steels, stainless steels, tool steels, high-speed steels and the like, titanium and titanium-based alloys and others. Quite unexpectedly, it was found that a grinder sludge occurring in a wet-process grinding work of metal articles can be one of metal powder sources suitable for use in the inventive method. In particular, grinder sludges from articles of stainless steels, general-purpose steels and titanium alloys are preferable for the purpose and grinder sludges of a stainless steel are more preferable in respect of the high and stable quality of the particles contained therein. Characteristically, the inventive method is applicable to the preparation of a porous sintered body of a ceramic material including powders of alumina, zirconia, PZT and the like as well as cemented metal carbides. The supply source or the preparation method of these powder materials is not particularly limitative. For example, grinder sludges containing particles of a metallic material can also be used quite advantageously.

With regard to the fineness of the powders of a metallic or ceramic material, the average particle diameter thereof is not particularly limitative but it should preferably be in the range not exceeding 100 μm or in the submicron range.

Examples of the binder resin which is a water-soluble polymer capable of being gelled in the aqueous slurried composition include polyvinyl alcohols, sodium alginate, agar-agars, mannose, guar gum, pectin, xanthan gum, methylcellulose, ethylcellulose and the like, of which polyvinyl alcohols are particularly preferable for use in the inventive method.

When a metallic or ceramic powder is blended in step (a) with an aqueous solution containing the binder resin, the mixing proportion of the powder and the aqueous solution is preferably in the range from 2:1 to 1:20 or, more preferably, in the range from 1:1 to 1:9 or, most preferably in the range from 1:2 to 1:5 by volume in order to ensure an easy procedure of foaming assuming that the concentration of the polymeric binder in the aqueous solution is in the range from 1 to 20 g/liter The blowing agent contained in the aqueous solution for mixing with the metallic or ceramic powder is not particularly limitative provided that a blowing gas can be generated therefrom by undertaking a foaming measure known in the prior art. Examples of suitable blowing agents include organic blowing agents such as hydrocarbon solvents having 5 to 8 carbon atoms in a molecule and inorganic blowing agents such as sodium hydrogencarbonate and the like. When a hydrocarbon solvent is used as an organic blowing agent, it is desirable that the hydrocarbon solvent has a boiling point lower than that of water as in pentanes, hexanes, heptanes, benzene and the like. The amount of the blowing agent, which naturally depends on the desired porosity of the porous body, is selected usually in the range from 0.1% to 50% or, preferably, from 5% to 50% by volume based on the overall volume of the slurried composition.

While the aqueous slurried composition as a precursor of a sintered porous body essentially contains a metallic or ceramic powder, water, a binder resin and a blowing agent as specified above, it is preferable in order to ensure uniform dispersion of the blowing agent or to ensure stability of the foamed condition that the slurried composition further contains a surface active agent. The ionic types of suitable surface active agents are not particularly limitative and any one of conventional surfactants can be used for the purpose including anionic surfactants such as salts of alkylbenzenesulfonic acids, salts of α-olefinsulfonic acids, salts of alkylsulfate esters, salts of alkylether sulfate esters, salts of alkanesulfonic acids and the like and non-ionic surfactants such as polyethyleneglycol derivatives, polyhydric alcohol derivatives and the like. The amount of the surface active agent in the slurried composition, which naturally should be varied in a wide range depending on the types of the surfactant used and the dispersed condition of the blowing agent, is usually selected, when used, in the range from 1 to 200% or, preferably, from 5 to 100% by volume based on the volume of the blowing agent.

It is further optional that the slurried composition containing a metallic or ceramic powder contains, in addition to the above mentioned surface active agents, a plasticizer compound such as glycerin, ethyleneglycol and the like with an object to effect adjustment of the porosity of the sintered porous body as the product and to improve the dispersed condition of the materials in the slurried composition.

It is of course essential in the inventive method that the slurried composition containing the essential ingredients including the metallic or ceramic powder, water, binder resin and blowing agent and the optional ingredients such as the surface active agent and other additives is subjected to a treatment for effecting gelation of the binder resin in order to attain a still higher viscosity condition of the composition which is then subjected to the treatment for foaming. If the foaming treatment precedes the gelation treatment, the foams as produced are necessarily subject to coalescence, disappearance, collapsing and the like so that the highly porous body as desired can hardly be obtained even with subsequent gelation.

The means for effecting gelation of the binder resin naturally depends on the types of the binder resin to be gelled. When the binder resin is a polyvinyl alcohol, for example, gelation of the polymer can be effected by simply keeping the slurried composition in a frozen state or by adding a gelation agent such as borax and the like to the slurry. A slurried composition containing agar-agar, pectin or xanthan gum can be gelled by chilling the slurry at a temperature lower than the room temperature. Sodium alginate, mannose and the like in the slurry can be gelled by adding a suitable electrolyte to the slurry. Methylcellulose and ethylcellulose can be gelled in the aqueous slurry when the slurry is heated to a temperature specified to the respective cellulose polymers. When the aqueous slurry is subjected to a treatment for effecting gelation of the binder resin contained therein, a precursor for foaming is obtained which consists of the metallic or ceramic powder, gelled binder resin and blowing agent.

In the method of the present invention, the thus obtained foaming precursor is subjected to a heating treatment to effect foaming by gas evolution from the blowing agent followed by drying and sintering of the metallic or ceramic particles. The temperatures for foaming, drying and sintering should be selected in consideration of the metallic or ceramic powder as the base material, softening temperature of the already gelled binder resin, decomposition or vaporization temperature of the blowing agent and other factors. Usually, the foaming temperature is selected in the range from 40 to 90° C. depending on various factors. Drying of the precursor takes place concurrently with foaming. The sintering temperature is varied in a wide range depending on the kind and particle size of the metallic or ceramic powder, desired bulk density or porosity of the porous body product and other factors. When these treatments are conducted under adequately selected conditions, the cell walls as containing the metallic or ceramic particles are safe from collapsing so as to maintain the closed cell texture of the foamed body resulting in a porous sintered body of the metallic or ceramic material having a very high porosity and a closed cell texture which could hardly be attained in the prior art methods.

The method of the present invention is accordingly free from the limitations in the prior art including a relatively low melt temperature of the metal in consideration of easy handling of the melt and matching of the gas-release or vaporization temperature of the blowing agent and the temperature range of the melt which naturally depends on the kind of the metal so that the applicability of the inventive method including simple and convenient steps can be extended not only to a great variety of metallic materials but also to various ceramic materials hardly workable in the prior art methods to give advantageously a high-porosity sintered porous body of a metallic material as well as ceramic material having a closed cell texture.

The industrial applicability of the inventive method covers preparation of articles having a light weight and high specific mechanical strength such as aircraft and spacecraft construction materials and sporting goods, articles having high heat insulation, good heat resistance and absorptivity of shock and vibration energies such as damping bodies, packaging materials and the like, and articles having a large surface area such as filters, catalyst carriers, electrode materials and the like as well as articles which should have high compatibility with living bodies.

In the following, the method of the present invention is illustrated in further detail by way of Examples.

EXAMPLE 1

The base powder used here was a powder of stainless steel SUS316L having an average particle diameter of 3 μm (PF-3, a product by Atmix Corp.). The water-soluble binder resin capable of being gelled was a polyvinyl alcohol of at least 99% saponification degree having an average molecular weight of 115000 which was dissolved in water in a concentration of 8% by mass. The polyvinyl alcohol solution was blended with n-hexane and a synthetic surface active agent mainly consisting of sodium alkylether sulfates in a volume ratio of 80:10:10 to give an aqueous mixture which was combined with the stainless steel powder in a volume ratio (aqueous mixture:powder) of 5:2 corresponding to a weight proportion of about 5:16 to give an aqueous slurry. The aqueous slurry was kept as such in a frozen state for about 24 hours to effect gelation of the polyvinyl alcohol. After thawing of the thus frozen slurry, the gelled mass obtained by thawing was kept in a thermostat at 80° C. for 10 hours so that the gelled mass was foamed and dried to give a dried porous body which was subjected to a sintering treatment in a vacuum furnace at 1050° C. for 30 minutes into a sintered porous body having a thickness of 100 mm, a bulk density of 0.4 g/cm$^3$ and a porosity of at least 95% and having a closed cell texture by the examination on an electron microscope which also indicated that the cell walls had a thickness of about 5 μm.

EXAMPLE 2

An alumina powder having an average particle diameter of 0.1 μm (a product by Taimei Chemicals Co.) was used as an example of ceramic powders, The binder resin was the same polyvinyl alcohol polymer as used in Example 1 and was used as an 8% by mass aqueous solution which was combined with n-hexane and the same surface active agent as in Example 1 in the same volume proportion as in Example 1 to give an aqueous mixture. An aqueous slurry prepared by mixing this aqueous mixture and the alumina powder in a volume ratio of 5:2 corresponding to a weight proportion of about 5:8 was kept in a frozen state for about 24 hours so that the polyvinyl alcohol became gelled to give a gelled mass, which was subjected, after thawing, to foaming and drying by keeping for about 10 hours in a thermostat held at 80° C. into a dry foamed body. This dry foamed body was then subjected to sintering by heating in an open furnace at 1050° C. for 2 hours to give a sintered porous alumina body having a thickness of 30 mm bulk density not exceeding 0.20 g/cm$^3$ and porosity of at least 95% and having a closed cell texture by the examination on an electron microscope which also indicated that the cell walls had a thickness of about 1 μm.

EXAMPLE 3

The experimental procedure for the preparation of a dry foamed body containing a metal powder was substantially the same as in Example 1 excepting for the replacement of the stainless steel powder with a powder of pure titanium metal having an average particle diameter of 30 μm (Tilop 45, a product by Sumitomo Titanium Corp,) in a weight proportion (aqueous mixture:powder) of about 5:9. The dry foamed body was then subjected to sintering by heating in a vacuum furnace at 1050° C for 1 hour to give a sintered porous body of titanium having a thickness of 30 mm, bulk density of 0.8 g/cm$^3$ and porosity of at least 90% and having a closed cell texture as examined on an electron microscope.

EXAMPLE 4

In place of the fresh metallic or ceramic powders used in the preceding Examples, a powder obtained by washing and drying of a grinder sludge of a stainless steel, equivalent to the SUS304 grade, of which the average particle diameter was 10 μm, was used as the metallic powder source. The grinder sludge was used as blended with a fresh powder of a general-purpose stainless steel (PF20, a product of Atmix Corp., average particle diameter 10 μm) in varied weight proportions indicated in Table 1 below with an object to improve the foamability of the slurried mixture.

The experimental procedure was substantially the same as in Example 1 except that the volume of the aqueous mixture blended with the metal powder was 25 ml per 50 g of the powder and excepting for the change of the stainless steel powder source as mentioned above and change of the mixing proportion of the aqueous mixture and the metal powder from 5:2 in Example 1 to 4:1 by volume, corresponding to a weight proportion of about 1:2, to give sintered porous bodies having bulk densities not exceeding 0.88 g/cm$^3$ and porosities of at least 89%. It should be noted that the experiment No. 6 might be subject to disturbance on the foaming procedure due to untimely pressure reduction in the course of drying at 80° C. The pressure reduction during drying was undertaken with an object to further improve the porosity of the foamed body.

TABLE 1

| Experiment No. | (Grinder sludge):(PF 20), by weight | Porosity, % |
| --- | --- | --- |
| 1 | 1:0 | 90 |
| 2 | 2:1 | 93 |
| 3 | 1:1 | 94.5 |
| 4 | 1:4 | 96 |
| 5 | 0:1 | 97 |
| 6 | 1:0 | 92.5* |

*See text.

What is claimed is:

1. A method for the preparation of a sintered porous body of particles of a metallic or ceramic powder which comprises the successive steps of:
   (a) blending a powder of a metallic or ceramic material with water, polyvinyl alcohol as a binder resin and a blowing agent to give an aqueous foamable composition;
   (b) subjecting the aqueous foamable composition to a freezing for effecting gelation of the polyvinyl alcohol to give a gelled mass of the composition;
   (c) subjecting the gelled mass of the composition to a heating treatment in a range from 40-90° C., under conditions that keep the PVA resin in a gelled state, for effecting foaming of the gelled polyvinyl alcohol resin to give a foamed body of the composition; and
   (d) subjecting the foamed body of the composition to a heat treatment so as to effect drying thereof and sintering of the particles of the metallic or ceramic powder.

2. The method for the preparation of a sintered porous body of particles of a metallic or ceramic powder as claimed in claim 1 in which the aqueous foamable composition prepared in step (a) further contains a surface active agent.

3. The method for the preparation of a sintered porous body of particles of a metallic or ceramic powder as claimed in claim 1 in which the gelled mass of the composition obtained in step (b) is shaped into a definite form.

* * * * *